United States Patent [19]

Charng

[11] Patent Number: 5,077,860
[45] Date of Patent: Jan. 7, 1992

[54] WIPER BLADE ASSEMBLY WITH ARM TO YOKE CONNECTION

[76] Inventor: Cedric S. K. Charng, 3F-1, No. 5, Lane 56, Wan An Street, Moojar, Taipei City, Taiwan

[21] Appl. No.: 668,885

[22] Filed: Mar. 13, 1991

[51] Int. Cl.⁵ .................................................. B60S 1/40
[52] U.S. Cl. .............. 15/250.32; 15/250.31; 403/163; 403/330
[58] Field of Search .......... 15/250.32, 250.31, 250.42, 15/250.35, 250.36; 403/163, 330, 322, 324, 325, 326

[56] References Cited

U.S. PATENT DOCUMENTS

| | | | |
|---|---|---|---|
| 3,866,260 | 2/1975 | Cone | 15/250.32 |
| 3,883,919 | 5/1975 | Harbison et al. | 15/250.42 |
| 4,180,885 | 1/1980 | Thornton et al. | 15/250.32 |
| 4,214,343 | 7/1980 | Dudek | 15/250.32 |
| 4,224,001 | 9/1980 | Arndt et al. | 15/250.32 |
| 4,240,177 | 12/1980 | Harbison et al. | 15/250.32 |
| 4,343,062 | 8/1982 | van den Berg | 15/250.32 |
| 4,503,580 | 3/1985 | Sharp | 15/250.32 |
| 4,649,591 | 3/1987 | Guerard | 15/250.32 |

FOREIGN PATENT DOCUMENTS

| | | | |
|---|---|---|---|
| 721442 | 11/1965 | Canada | 15/250.32 |
| 1433668 | 4/1976 | United Kingdom | 15/250.32 |

*Primary Examiner*—Harvey C. Hornsby
*Assistant Examiner*—Gary K. Graham
*Attorney, Agent, or Firm*—Howson & Howson

[57] ABSTRACT

A wiper blade assembly comprising a primary yoke having a central portion with transverse socket means therein for receiving a pivot pin of a wiper arm of the side mounting type. A plastics latching member is located within a recess open to the topside or underside of the central portion and in communication with the pivot pin receiving socket. The latching member has protrusions at opposite ends which engage inwardly with engaging means in the recess to detachably retain the latching member within the recess.

8 Claims, 3 Drawing Sheets

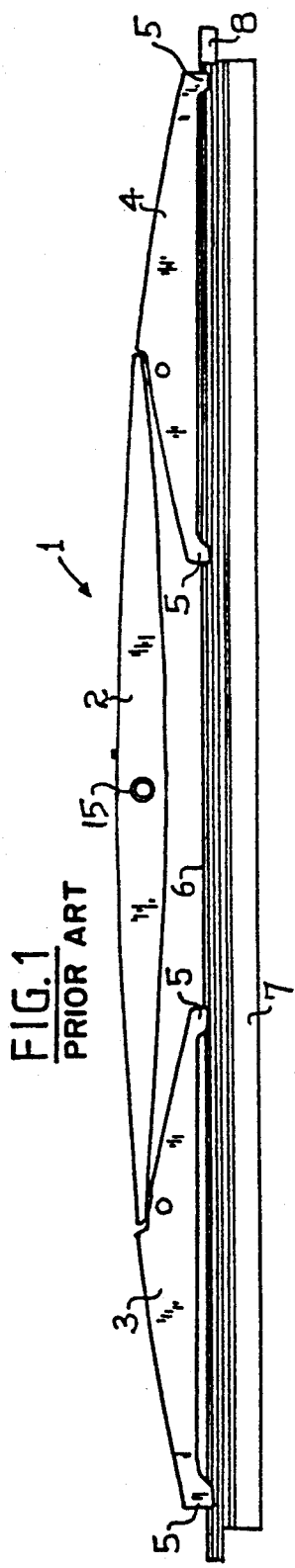
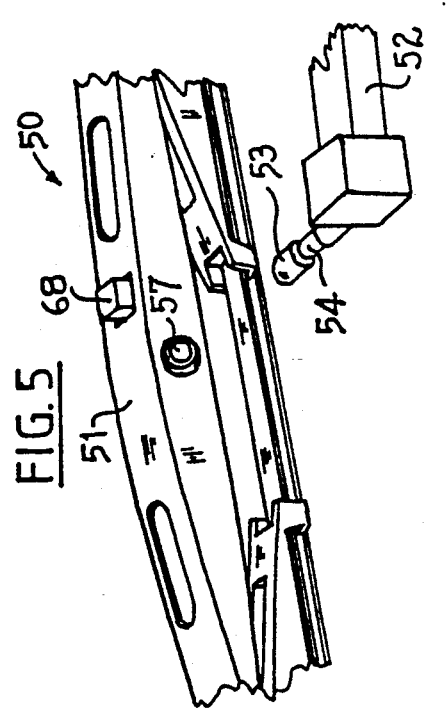
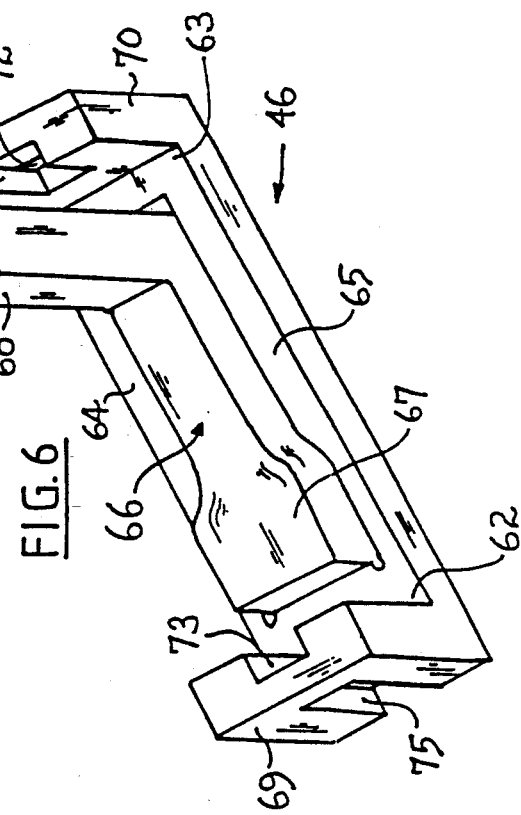

WIPER BLADE ASSEMBLY WITH ARM TO YOKE CONNECTION

BACKGROUND OF THE INVENTION

This invention relates to a wiper blade assembly and more particularly to a wiper blade pressure distributing yoke provided with means to enable it to be coupled to a wiper arm having a pivot pin of the side mounting type. Primarily the invention is concerned with wiper blade assemblies for vehicle windshields or windscreens but it may also find application for use with vehicle headlamps.

Wiper arms of the side mounting type have a transversely extending pivot pin protruding from one side. In use the pivot pin is inserted into a transverse socket formed in a main yoke of a wiper blade assembly and conventionally is detachably held in position within the socket by some form of latching device cooperating with an annular recess formed in, and spaced from a free end of, the pivot pin.

One known type of wiper blade assembly is disclosed in U.S. Pat. No. 4,503,580. In this known specification, the wiper blade assembly includes a primary yoke having a rigid central portion in which is formed a transverse pivot pin receiving socket extending from one to the other side of the central portion. A plastics latching member is mounted within a yoke recess which is formed in the underside of the central portion and which opens into the pivot pin receiving socket. The yoke recess extends underneath the pivot pin receiving socket from an upwardly extending yoke pocket to an upwardly extending yoke passageway which opens to the topside of the central portion, the yoke pocket and yoke passageway being disposed on opposite sides of a transverse vertical plane containing the axis of the pivot pin receiving socket. The latching member has at one of its end an anchoring plug consisting of two spaced apart, upwardly extending protrusions which are received within the yoke pocket to retain the latching member in the yoke recess. The latching member further comprises a latching portion resiliently joined to the bottom of the anchoring plug and which is normally received within an annular recess of a wiper arm pivot pin to retain the latter in the pivot pin receiving socket, and a finger depressible actuating member rigidly joined to the latch portion and positioned in, so as to extend to the top of, the yoke passageway and which can be depressed to resiliently move the latch portion relative to the anchor portion and clear of the pivot pin annular recess thereby allowing the pivot pin to be removed from the pivot pin receiving socket. The yoke pocket has a mouth portion leading into a wider chamber thereover. The spaced apart upwardly extending protrusions of the anchoring plug have enlarged heads each provided with a downwardly and outwardly sloped end surface with a ledge thereunder. During connection of the latching member, the anchoring plug is pushed upwardly into the yoke pocket. As the sloping end surfaces of the enlarged heads pass through the mouth portion of the yoke pocket, they are resiliently urged towards each other before springing apart as they enter the wider chamber of the yoke pocket. The ledges of each enlarged head engage against walls of the wider chamber bordering the mouth portion and anchor the latching member in position.

The latching member of the wiper blade assembly described in U.S. Pat. No. 4,503,580 is anchored in position solely by the engagement of the enlarged heads of the upwardly extending anchoring protrusions within the enlarged chamber of the yoke pocket. The yoke pocket and the protrusions have to be manufactured to high tolerances to ensure a tight fit of the anchoring plug in the yoke pocket so that the latching member is securely seated within the yoke recess and does not move to an unwarranted extent; to ensure, for the sake of a good appearance, that the latching member seats flush with the bottom of the central portion of the yoke in normal use; and to ensure that depression of the finger depressible actuating member does not create a sufficiently large downward force and/or turning force on the anchoring plug to cause the latter to become released from its anchored position. Since the latching member is anchored at one end only, any slight play between the anchoring plug and the yoke pocket when the latching member is in its anchored position will be amplified at the position where the latching portion engages with the pivot pin recess in the region of the pivot pin socket.

An alternative proposal for anchoring a latching member within a yoke recess is shown in FIGS. 1 and 2. In this alternative proposal, two latching protrusions are provided. However, instead of these latching protrusions being at one end only of the latching member, they are provided at opposite ends of the latching member with each latching protrusion having an enlarged head which interengages with an outwardly disposed cavity at either end of a yoke recess. A resiliently deflectable latching portion forming an integral part of the latching member is joined to the latter adjacent one of its ends and extends between the opposite ends of the latching member. An upstanding, finger depressible actuating member positioned between the two latching protrusions is integrally joined to the other end of the latching member and is depressible to release the latching portion from engagement with an annular recess of a wiper arm pivot pin.

Such a latching member overcomes many of the problems associated with wiper blade assembly described in U.S. Pat. No. 4,503,580. However there are two additional drawbacks to the design. Firstly, the downward depression of the actuating member causes the base of the latching member to bow downwardly between its ends causing the upper ends of the two latching protrusions to move in towards each other. This results in each of the enlarged heads of the latching protrusions being moved in a direction out of interengagement with its associated outwardly disposed cavity in the yoke recess. In practice the downward pressure on the finger depressible latching member often leads to the disengagement of the latching member from the yoke recess so that the latching member becomes detached from the yoke. Secondly, the length of the yoke recess is less than the length of the latching member between the enlarged heads of the latching protrusions, the upper ends of the latching protrusions containing these enlarged heads therefore have to be resiliently urged or squeezed together during assembly of the wiper blade assembly to ensure that the latching member can be inserted into the yoke recess. The assembly process is therefore made more complicated.

SUMMARY OF THE INVENTION

An object of the present invention is to provide a wiper blade assembly having a new means for detachably connecting thereto a wiper arm of the side mounting type.

Another object of the present invention is to provide a simple means for enabling a wiper arm of the side mounting type to be securely connected to, whilst being easily detachable from, a wiper blade assembly.

A further object of the present invention is to provide a more secure method of detachably connecting a latching member within a recess of a wiper yoke.

Another object is to provide a latching member which can be easily assembled within a wiper blade yoke recess.

According to the present invention there is provided a wiper blade assembly comprising a main yoke having a central portion provided with spaced apart opposite side walls, a top side, a bottom side, transverse socket means opening into at least one of said opposite side walls for receiving a sidewise extending wiper arm pivot pin having an annular recess spaced from a free end thereof, recess means defining a lengthwise extending recess which opens to one of said top and bottom sides, a pair of first engaging means each adjacent a respective opposite end of said recess, and an integrally molded latching member made of plastics material detachably received in said recess, the latching member comprising a body part having spaced apart opposite end portions joined together by first and second spaced apart side portions, a latch part for location in the annular recess of a wiper arm pivot pin received in said socket means, the latch part extending between said end portions and said side portions and being integrally joined by resilient connection means to at least one of said two end portions, actuating means positioned between said spaced apart end portions of the body part and actuable to resiliently deflect the latch part between said end portions, and a pair of protrusions each integrally joined to a respective one of said end portions and each having second engaging means which resiliently interengage inwardly with a respective one of said pair of first engaging means to detachably secure the latching member within said lengthwise extending recess.

Preferably one of each pair of interengaging first and second engaging means comprises projecting means and the other of each pair of interengaging first and second engaging means comprises recess means within which the projecting means is received. In this case the said other of each pair of interengaging first and second engaging means further comprises a channel leading to the recess means for guiding the projecting means into the recess means during fitting of the latching member into the recess. Preferably one of said channel and said projecting means has a sloping surface which, during movement of the latching member into the recess to fit the latching member into the recess, urges the associated protrusion resiliently outwards prior to subsequent interengagement of the projecting means in said recess means.

Preferably the maximum length of the latching member is less than the length of the recess where it opens into said one of said top and bottom sides.

Conveniently said resilient connection means joins one end only of said latch part to one only of said end portions, the other end of the latch part being joined to said actuating means which is elongate and extends generally perpendicular to the latch part to the other of said top and bottom sides. Alternatively, the resilient connection means may join opposite ends of the latch part to respective ones of said end portions, the actuating means comprising sideways projecting portions positioned between the opposite ends of the latch part and projecting outwardly of the opposite side walls of said central portion.

Preferably channel means are formed in said protrusions to facilitate access to the first and second engaging means to disengage the latter when they are interengaged.

BRIEF DESCRIPTION OF THE DRAWINGS

The foregoing and other objects, features and advantages of the invention will be further apparent from the following detailed description and accompanying schematic drawing of an illustrative embodiment of the invention in which:

FIG. 1 is a side elevation of a known wiper blade assembly for attachment to a wiper arm of the side mounting type;

FIG. 5 is an enlarged partial perspective view schematically showing a central portion of a main yoke of a wiper blade assembly according to the invention and an end of a wiper arm connectible thereto;

FIG. 6 is an enlarged perspective view of a latching member for releasable attachment within a yoke recess of the wiper blade assembly shown in FIG. 5;

DESCRIPTION OF THE PREFERRED EMBODIMENTS

Figure 2:
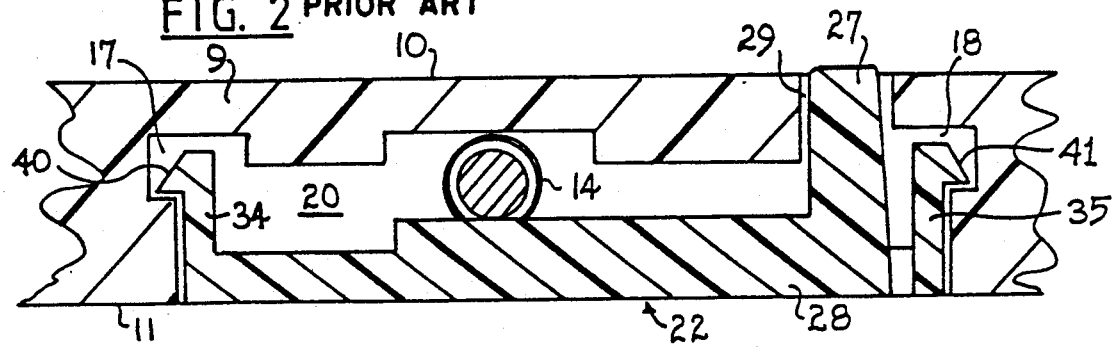
FIG. 2 is a longitudinal sectional view of a central part of the main yoke of the wiper blade assembly shown in FIG. 1 and illustrates a latching member detachably received in a yoke recess.

FIG. 1 shows a known wiper blade assembly 1 comprising a plastics main yoke 2 having plastics secondary yokes 3 and 4 pivotally connected to opposite ends thereof in a known manner. The secondary yokes 3 and 4 have claws 5 engaged in elongate grooves along the opposite sides of a plastics carrier strip 6 carrying a wiper blade 7. A metal end clip 8 of known design is detachably connected to the strip 6 and engages the outer claw 5 of the secondary yoke 4 to prevent strip 6 from becoming slidingly detached from the retaining claws.

The main yoke 2 has a central portion 9 (see FIG. 2) having a topside 10, an underside 11 and spaced apart side walls. A pivot pin receiving socket means 14 extends from one to the other of said side walls and is defined at the side walls by annular side wall projections 15 (only one of which can be seen in FIG. 2). These projections 15 are intended to be received in the holes (not shown) of a straddle-type adaptor (not shown) detachably connectible to the central portion for connecting the wiper assembly 1 to an end of a wiper arm (not shown) other than of the side mounting type.

Opening into the underside 11 of the central portion 9 and extending beneath the socket means 14 is a generally rectangular recess 20. The recess 20 has enlarged cavities 17 and 18 at its opposite ends and, between its ends, communicates with the socket means 14.

Figure 3:
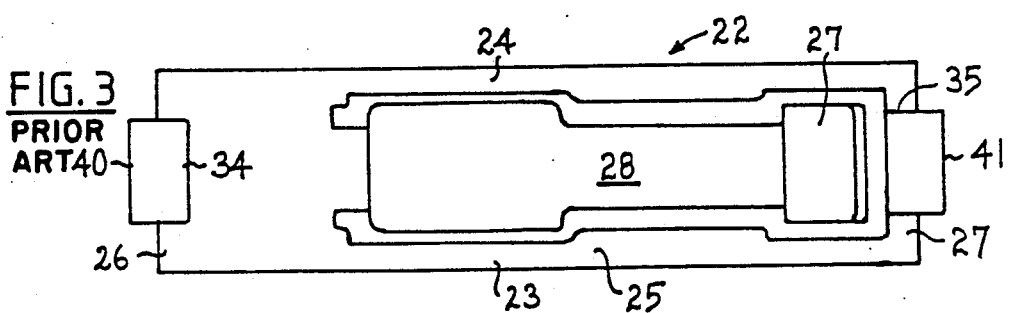
FIG. 3 is a plan from above of the latching member shown in FIG. 2.
Figure 7:
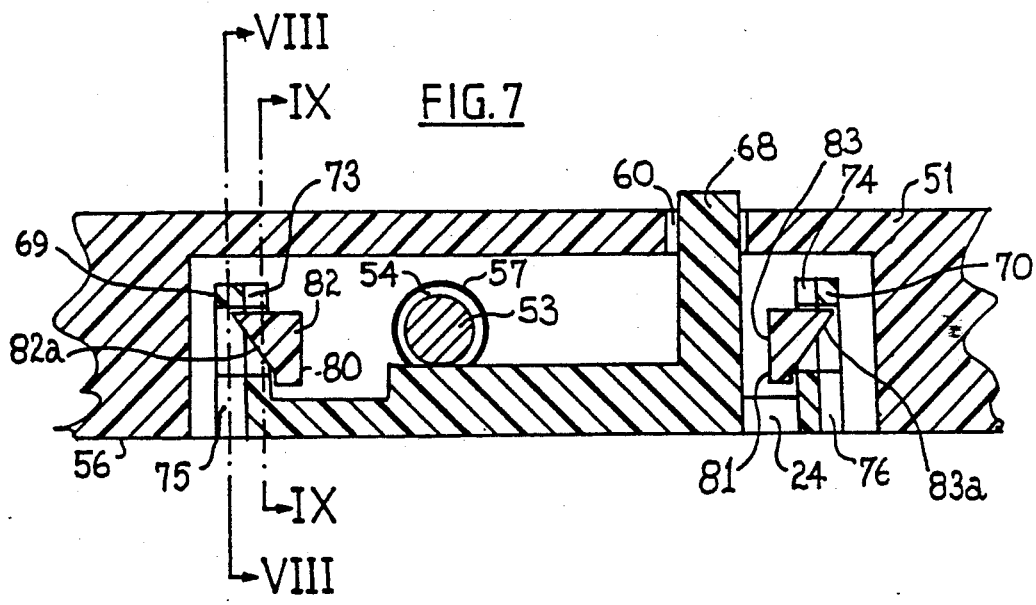
FIG. 7 is an enlarged longitudinal sectional view of the main yoke of the wiper blade assembly shown in FIG. 5 illustrating the latching member within the yoke recess.
Figure 8:
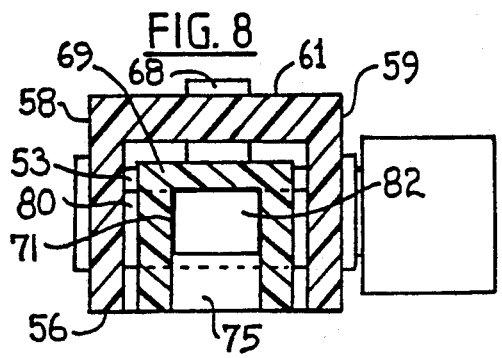
FIGS. 8 and 9 are sectional views taken on the line VIII—VIII and IX—IX, respectively, of FIG. 7.
Figure 9:
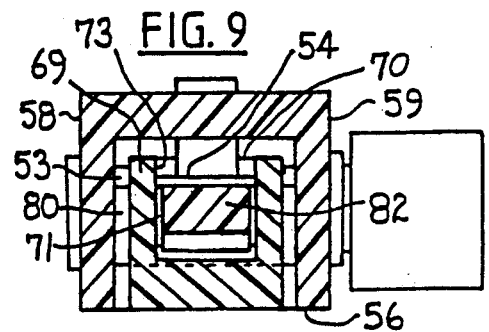

A molded plastics latching member 22 (see FIGS. 2 and 3) is located within the recess 20 and comprises an outer first body part 23 having spaced apart side regions 24 and 25 and spaced apart end regions 26 and 27, and an inner, L-shaped second body part 28 which is arranged between the spaced apart side regions 24 and 25. One end of the second body part 28 is integrally joined to the end region 26 and the other end of the body part 28 is integrally joined to an upwardly extending actuator 27 which extends through an opening 29 to the topside 10. The latching member 22 further includes first and second protrusions 34 and 35 which are integrally joined to, and extend upwardly from, the end regions 26 and 27, respectively. The upper ends of the protrusions 34 and 35 have enlarged heads 40 and 41, respectively, each with an angled surface which slopes downwardly and outwardly.

Figure 4:
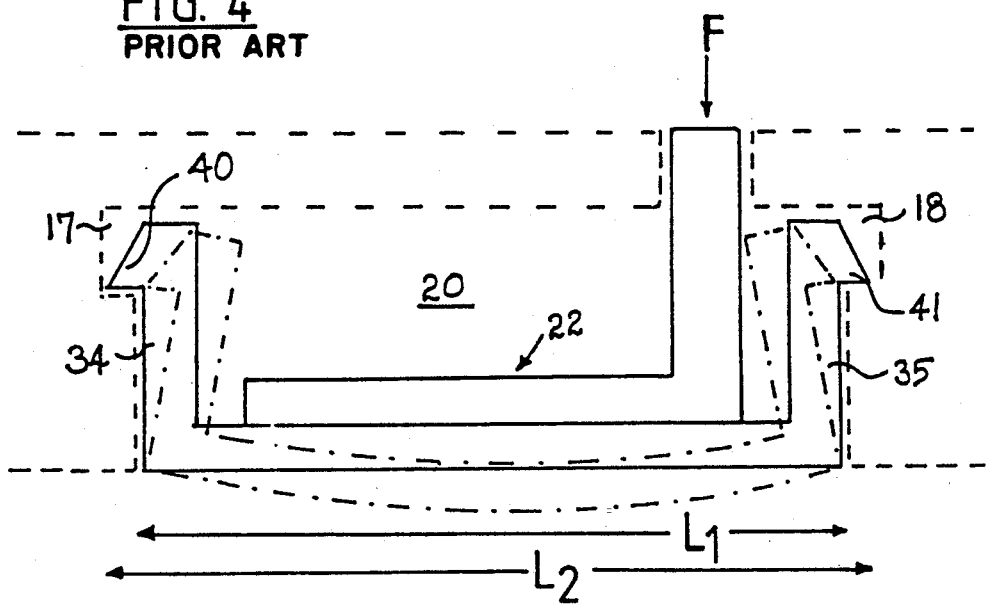
FIG. 4 is a schematic side view illustrating attachment of the latching member shown in FIG. 3 within the yoke recess shown in FIG. 2.

The latching member 22 is attached to the primary yoke 2 by squeezing the upper ends of the protrusions resiliently towards each other which causes the latching member to bow downwardly (e.g. similar to the manner shown in chain lines in FIG. 4). The inwardly deflected upper ends of the protrusions 34 and 35 are then located at opposite ends of the recess 20 and the latching member is pushed upwardly into the recess 20. As the latching member moves upwardly into the recess 20, the enlarged heads 40 and 41 slide against end walls of the recess 20 causing the protrusions 34 and 35 to deflect further resiliently inwards and the latching member to resiliently bow even further (e.g. in a manner similar to that shown in FIG. 4). At the end of this upwards travel the protrusions 34 and 35 spring back under their own resilience so that the enlarged heads 40 and 41 engage outwardly in the enlarged cavities 17 and 18, respectively, thereby retaining the latching member within the recess 20.

There are disadvantages with this known design of wiper blade assembly described with reference to FIGS. 1-4. Firstly, because the maximum length $L_2$ (see FIG. 4) of the latching member 22 is greater than the length $L_1$ of the mouth of the recess 20, the latching member 22 has to be resiliently flexed into a bowed shape, as previously described, to shorten the distance between the ends of the latching member and thereby enable the latching member to be fitted within the recess 20. This complicates factory assembly resulting in slower and therefore more costly production of wiper blade assemblies. Secondly, and more importantly, however, the method of attaching the latching member to the main yoke within the yoke recess can lead to the latching member becoming accidentally detached from the main yoke on pressing the actuator 27. Such detachment can occur when the actuator 27 is pressed downwardly with a force F (see FIG. 4) to cause the second body part 28 to deflect resiliently downwards out of engagement with an annular recess 36 (not shown in FIG. 4) of a pivot pin of the sideways mounting type received in the socket means. The force F, however, is applied between the opposite ends of the latching member 22 and thus the latching member is caused to bow resiliently between its ends with the upper ends of the protrusions 34 and 35 being drawn inwardly towards each other as illustrated schematically in chain lines in FIG. 4. As the upper ends of the protrusions 34 and 35 move inwardly towards each other, the enlarged heads 40 and 41 move out of their engaged positions within the enlarged cavities 17 and 18, respectively. If the force F is sufficiently large, the heads 40 and 41 become completely disengaged from the cavities 17 and 18, respectively, and the downward force F then will cause the entire latching member 22 to be pushed downwardly out of the recess 20. The magnitude of the force F required to cause such detachment of the latching member 22 from the main yoke is not excessive and normal finger pressure on the actuator 27 to operate the latter can cause the detachment.

In order to overcome the disadvantages of the prior art, a new method of latching member retention has been devised in accordance with the present invention. In particular FIGS. 5-10 illustrate one embodiment of a wiper blade assembly 50 according to the invention. The embodiment is described by way of example with particular reference to a wiper blade assembly of the type shown in FIG. 1, but it will be appreciated by those skilled in the art that the invention is equally applicable to other types of wiper blade assembly. Several features of the wiper blade assembly 50 are similar to features of the wiper blade assembly shown in FIGS. 1-4 and only features of difference will be described in detail hereinafter.

FIG. 5 shows the central part of a main yoke 51 of the wiper blade assembly 50. The wiper blade assembly 50 is shown disconnected from a wiper arm 52 having a pivot pin 53 of the side mounting type and provided with an annular recess 54 between its ends. The main yoke 51 has a generally rectangular section recess 55 (see FIGS. 7-10) opening into its underside 56, a pivot pin receiving socket 57 extending between its opposite side walls 58 and 59 and an opening 60 which opens into its topside 61 and communicates with the recess 55. Transverse members 80 and 81 are located within the recess 55 and bridge between opposite side walls thereof. The members 80 and 81 are spaced a short distance inwardly of the end walls of the recess 55 and are provided with centrally positioned projections 82 and 83, respectively, each of generally rectangular section which project outwardly towards the adjacent recess end wall. As can be seen clearly in FIG. 7, the underside of each projection 82 (83) has a sloping surface 82a (83a) which slopes downwardly and inwardly from its upper and outer end.

A latching member 46 (see FIG. 6) is received within the recess 55 and has spaced apart opposite end portions 62 and 63 and spaced apart opposite side portions 64 and 65. A generally L-shaped body part 66 has one arm comprising a latch part 67 which is integrally joined at its free end to the end portion 62 by a resilient connection and another arm comprising an actuator 68 which passes upwardly through the opening 60 so as to project slightly above the topside 61. Upwardly extending protrusions 69 and 70 are integrally joined to the end portions 62 and 63, respectively.

Each protrusion 69 (70) is provided with a rectangular section opening 71 (72) passing from one to the other side of the protrusion, a rectangular section channel 73 (74) formed on the inside of the protrusion and extending upwardly from the top of the opening 71 (72) to the top of the protrusion and a rectangular section channel 75 (76) formed on the outside of the protrusion and extending downwardly from the bottom of the opening 71 (72) to the bottom of the protrusion.

The latching member 46 is attached to the main yoke 51 by locating the upper ends of the protrusions 69 and 70 adjacent opposite ends of the recess 55 beneath the underside 56 and pushing the latching member 46 upwardly into the recess 55. As the latching member 46 moves upwardly into the recess 55, each protrusion edge defined by the meeting of the upper surface of each protrusion 69 (70) with the bottom surface of the channel 73 (74) initially engages against the sloping surface 82a (83a). Continued upward movement of the latching member 46 into the recess 55 causes each protrusion edge to move upwardly along the sloping surface 82a (83a), thereby resiliently deflecting the protrusion 34 (35) outwardly, before the outer, upper edge of the projection 69 (70) is received in and slides along the bottom of the channel 73 (74). In the final stages of the upward movement of the latching member 46 into the recess 55, the projections 69 and 70 reach the lower ends of the channels 73 and 74, respectively, and the protrusions are able to resiliently return inwardly to their undeflected conditions with the projections 69 and 70 engaged in the openings 71 and 72, respectively (see FIGS. 7-9). In the attached condition of the latching member 46 shown in FIGS. 7-9, the underside of the latching member is substantially flush with the underside 56 of the main yoke. The latch part 67 is received in the annular recess 54 of the pivot pin 53 and can be released from its latching position by pushing downwardly, e.g. with a finger, on the actuator 68 to move the latch part resiliently downwards clear of the recess 54. If it is desired to release the latching member 46, it is possible to insert a tool from below upwardly along the channels 75 and/or 76 to resiliently flex the upper end(s) of the protrusion(s) outwardly so that the openings 71 (72) become disengaged from their associated projections 82 (83).

The initial connection of the pivot pin 53 to the latch part 67 is achieved by merely inserting the pivot pin into the socket 57. The rounded free end of the pivot pin initially contacts the latch part 67. As the pin is pushed further into the socket, the rounded pivot pin end resiliently deflects the latch part 67 downwardly clear of the socket. In the final stages of pivot pin insertion, the annular recess 54 moves into a central position between the side walls of the main yoke and the latch part is able to return, under its own resilience, to an engaging position (shown in FIGS. 7-9) within a part of the annular recess 54.

Figure 10:
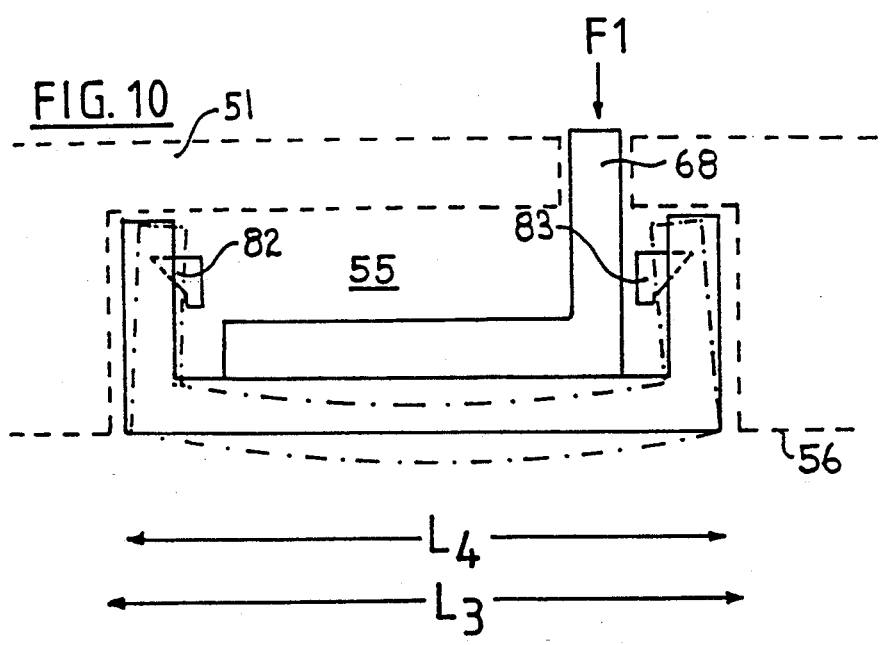
FIG. 10 is a schematic side view illustrating attachment of the latching member shown in FIG. 6 within a yoke recess.

With particular reference to FIG. 10 (which is only schematic and does not show the pivot pin or pivot pin-receiving socket), it will be appreciated that the length $L_3$ of the recess 55 where it opens to the underside 56 of the main yoke 51 is greater than the maximum length $L_4$ of the latching member 46. Thus assembly of the wiper blade assembly 50 is facilitated since it is not necessary to deflect the upper ends of the protrusions inwardly to enable the latching member to be moved upwardly into the recess 55. The main advantage of the wiper blade assembly 50, however, is that, on downward pressing of the actuator 68 with a force F1, any tendency of the latching member to bow between its ends causes the upper ends of the protrusions 69 and 70 to move inwardly towards each other (see chain lines in FIG. 10). Any such inward movement of the upper ends of the protrusions tends to increase or "tighten" the interengagement of the projections 82 and 83 in the openings 71 and 72, respectively, thus counteracting the tendency of the downward force F1 to urge the latching member downwardly out of the recess 55.

Figure 11:
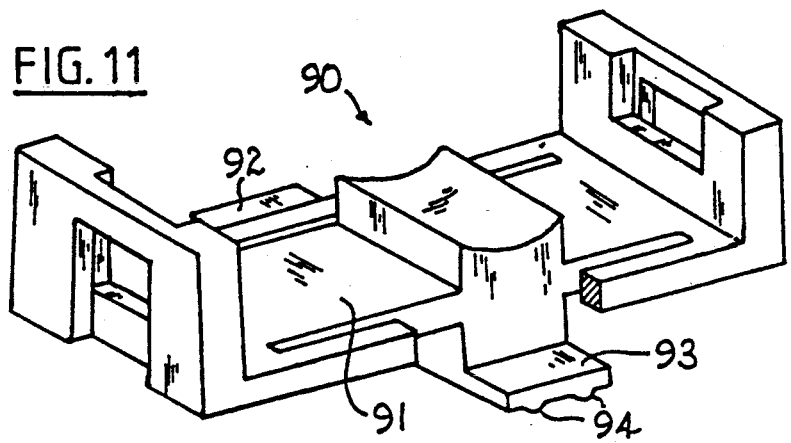
FIG. 11 is an alternative form of latching member for attachment within a yoke recess of a main yoke of a wiper blade assembly according to the invention.

Another embodiment of latching member suitable for attachment in a yoke recess of the kind similar to recess 55, is shown in FIG. 11 and is generally designated by the reference numeral 90. In FIG. 11 the side of the latching member is shown partly cut away. The protrusions at opposite ends of the latching member 90 are formed similarly to those on the latching member 46 and will not be further described. Latch part 91, however, is resiliently joined to opposite ends of the latching member and is provided with outwardly extending wings 92 and 93 strengthened with cross ribs 94. These wings 92 and 93 can be gripped or pushed downwards to resiliently deflect the latch part downwards. As with latching member 46, any tendency of the latching member 90 to bow downwardly on downward movement of the wings 92 and 93 results in a tightening or increase in the projection/opening interengagement.

Other modifications may be made within the scope of the ensuing claims. For example, although the invention has been described with regard to the attachment of a latching member in a recess formed in the underside of a main yoke, it will be appreciated that the yoke recess could open to the topside of the main yoke with the protrusions of the latching member extending downwards. It is also possible to design projection/opening interengagement in which the transverse members 80 and 81 are provided with openings and the protrusions have inwardly extending projections. In all embodiments, however, any inward movement or inwardly directed force on the free ends of the protrusions should lead to a tightening or increase in their interengagement with cooperating engaging means associated with the yoke recess.

I claim:

1. A wiper blade assembly comprising a main yoke having a central portion provided with spaced apart opposite side walls, a top side, a bottom side, transverse socket means opening into at least one of said opposite side walls for receiving a sidewise extending wiper arm pivot pin having an annular pin recess spaced from a free end thereof, recess means defining a lengthwise extending yoke recess which opens to one of said top and bottom sides, a pair of first engaging means each adjacent a respective opposite end of said yoke recess, and a one piece latching member made of plastics material detachably received in said yoke recess, the latching member comprising a body part having spaced apart opposite end portions joined together by first and second spaced apart side portions, a latch part for location in the annular recess of a wiper arm pivot pin received in said socket means, the latch part being positioned between said end portions and said side portions and being integrally joined by resilient connection means to at least one of said two end portions, actuating means positioned between said spaced apart end portions of the body part and actuable to resiliently deflect the latch part between said end portions, and a pair of protrusions each integrally joined to a respective one of said end portions and each having second engaging means which resiliently interengage inwardly towards the other protrusion with a respective one of said pair of first engaging means to detachably secure the latching member within said yoke recess.

2. A wiper blade assembly according to claim 1, in which one of each pair of interengaging first and second engaging means comprises projecting means and the other of each pair of interengaging first and second engaging means comprises recess means within which the projecting means is received.

3. A wiper blade assembly according to claim 2, in which said other of each pair of interengaging first and second engaging means further comprises a channel leading to the recess means for guiding the projecting means into the recess means during fitting of the latching member into the yoke recess.

4. A wiper blade assembly according to claim 3, in which one of said channel and said projecting means has a sloping surface which, during movement of the latching member into the yoke recess to fit the latching member into the yoke recess, urges the associated protrusion resiliently outwards prior to subsequent interengagement of the projecting means in said recess means.

5. A wiper blade assembly according to claim 1, in which the maximum length of the latching member is less than the length of the yoke recess where it opens into said one of said top and bottom sides.

6. A wiper blade assembly according to claim 1, in which said resilient connection means joins one end of said latch part to one of said end portions, the other end of the latch part being joined to said actuating means which is elongate and extends generally perpendicular to the latch part to the other of said top and bottom sides.

7. A wiper blade assembly according to claim 1, in which the resilient connection means joins opposite ends of the latch part to respective ones of said end portions, and the actuating means is connected between opposite ends of the latch part.

8. A wiper blade assembly according to claim 1, in which channel means are formed in said protrusions to facilitate access to the first and second engaging means to disengage the latter when they are interengaged.

* * * * *